United States Patent
Apodaca (10) Patent No.: US 9,747,657 B2
(45) Date of Patent: Aug. 29, 2017

(54) REDUCING POWER FOR 3D WORKLOADS

(75) Inventor: Michael Apodaca, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 110 days.

(21) Appl. No.: 13/976,906

(22) PCT Filed: Nov. 30, 2011

(86) PCT No.: PCT/US2011/062619
§ 371 (c)(1),
(2), (4) Date: Jun. 24, 2014

(87) PCT Pub. No.: WO2013/081602
PCT Pub. Date: Jun. 6, 2013

(65) Prior Publication Data
US 2014/0354659 A1    Dec. 4, 2014

(51) Int. Cl.
*G06T 1/20* (2006.01)
*G06F 15/76* (2006.01)
*G06F 1/32* (2006.01)

(52) U.S. Cl.
CPC ............... *G06T 1/20* (2013.01); *G06F 1/329* (2013.01); *G06F 1/3212* (2013.01); *G06F 1/3265* (2013.01); *G06F 15/76* (2013.01); *G06T 2200/28* (2013.01); *Y02B 60/1242* (2013.01); *Y02B 60/1292* (2013.01); *Y02B 60/144* (2013.01)

(58) Field of Classification Search
CPC ......... G06T 15/005; G06T 1/20; G06T 15/04; G09G 5/363; G06F 3/14
See application file for complete search history.

(56) References Cited

U.S. PATENT DOCUMENTS

| 7,256,788 B1 | 8/2007 | Luu et al. |
| 7,782,333 B2 | 8/2010 | Yamaguchi et al. |
| 8,320,464 B2 | 11/2012 | Raveendran et al. |

(Continued)

FOREIGN PATENT DOCUMENTS

| JP | H089347 | 1/1996 |
| JP | 2005003692 | 1/2005 |

OTHER PUBLICATIONS

Search Report received for R.O.C. Patent Application No. 101142606, mailed Oct. 9, 2014, 2 pages including 1 page English Translation.

(Continued)

*Primary Examiner* — Todd Buttram (57) ABSTRACT

Various embodiments are presented herein that may reduce the workload of a system tasked with delivering frames of video data to a display generated by applications executing within the system. Applications executing within the system may generate new frames of video content at a specified frame rate known as frames per second (FPS). The CPU and/or GPU may be responsible for actually generating the frames at the specified FPS. These frames are then delivered to a display communicatively coupled with the system for rendering. Reducing the frame rate (FPS) may reduce the work being performed by the system because fewer frames may be generated within a given time period. This may be especially advantageous when the system is operating on battery power because it can extend the life of the battery.

32 Claims, 6 Drawing Sheets

(56) References Cited

U.S. PATENT DOCUMENTS

| | | | |
|---|---|---|---|
| 2003/0233592 A1* | 12/2003 | Lin | G06F 1/3228 713/320 |
| 2004/0017502 A1* | 1/2004 | Alderson | H04N 5/23212 348/345 |
| 2006/0056515 A1 | 3/2006 | Kato et al. | |
| 2006/0159366 A1* | 7/2006 | Darwish | G06F 17/30017 382/276 |
| 2007/0091204 A1 | 4/2007 | Koshimizu et al. | |
| 2007/0139427 A1 | 6/2007 | Sahashi | |
| 2008/0079732 A1 | 4/2008 | Park et al. | |
| 2008/0091605 A1* | 4/2008 | Hughes | G06F 21/31 705/51 |
| 2008/0108396 A1* | 5/2008 | Lundqvist | H04W 52/0277 455/574 |
| 2009/0023482 A1* | 1/2009 | Koura | G09G 3/20 455/574 |
| 2011/0141372 A1 | 6/2011 | Kato et al. | |
| 2011/0157191 A1 | 6/2011 | Huang et al. | |
| 2011/0298962 A1* | 12/2011 | Shiohara | H04N 5/23235 348/333.02 |
| 2012/0166777 A1* | 6/2012 | McLellan | G06F 9/3851 712/245 |

OTHER PUBLICATIONS

International Search Report and Written Opinion mailed Jul. 30, 2012 for corresponding PCT/US2011/062619 filed Nov. 30, 2011 (ten (10) pages).
Extended European Search Report received for European Patent Application No. 11876423.2, mailed Jul. 6, 2015, 21 pages.
Office Action and Search Report received for Chinese Patent Application No. 201180075158.X, mailed Oct. 9, 2015, 10 pages (untranslated).

* cited by examiner

REDUCING POWER FOR 3D WORKLOADS

BACKGROUND

Computing platforms are generally capable of operating on a direct power source or on battery power when a direct power source is unavailable. Battery power is naturally a finite resource and must be recharged periodically. Considerable thought has gone into methods and techniques for extending the operating time of a computing platform while operating on battery power. Many computing platforms utilize both central processing units (CPUs) and graphics processing units (GPUs) within an overall system. One technique for reducing overall system power consumption and extending battery life is to reduce the frequencies at which the CPU and GPU operate while on battery power. This technique does not necessarily reduce the amount of work performed by the CPU or GPU—rather it slows down the pace at which the work is done. Another approach may be to reduce the actual workload associated with an application executing on either the CPU or GPU. Accordingly, there may be a need for improved techniques to solve these and other problems.

DETAILED DESCRIPTION

Various embodiments are presented herein that may reduce the workload of a system tasked with delivering frames of video data to a display generated by applications executing within the system or computing platform. Applications executing within the system may generate new frames of video content at a defined frame rate known as frames per second (FPS). The application may be capable of supporting multiple defined frame rates. The CPU and/or GPU may be responsible for actually generating the frames at the specified FPS. These frames are then delivered to a display communicatively coupled with the system for rendering. Reducing the frame rate (FPS) may reduce the work being performed by the system because fewer frames may be generated within a given time period. This may be especially advantageous when the system is operating on battery power because it can extend the life of the battery.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
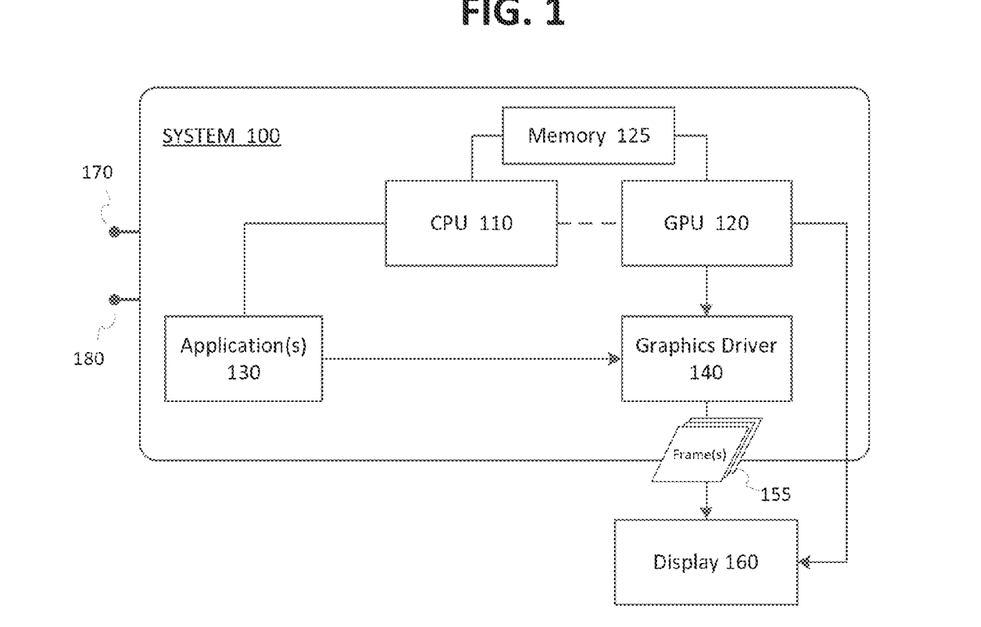
FIG. 1 illustrates a block diagram of an architecture suitable for carrying out embodiments of the invention.

FIG. 1 illustrates a system 100 implementing an exemplary computing platform. The system 100 may include a processor circuit denoted as CPU 110, a processor circuit denoted as GPU 120, and memory 125. An application 130 may be executing under the control and supervision of the CPU 110. The system 100 may further include a graphics driver 140. In operation, an application may call the graphics driver 140 to present frame(s) 155 of video content. The graphics driver 140 may then handle the presenting of a frame 155 to a display 160. The frame presentation may or may not involve the GPU 120. The system 100 may be powered by either an external direct current (DC) source 170 or battery power 180. The graphics driver 140 may be operative to determine whether the system 100 is being powered by the external DC source 170 or the battery power 180. The system 100 may also be communicatively coupled with the display 160.

Once the graphics driver 140 determines that the system 100 is operating on battery power 180, the graphics driver 140 may take some additional steps to reduce the workload of the system 100 to conserve battery power 180. The additional steps are described in more detail below and may take place prior to the graphics driver 140 presenting a frame 155 to the display 160.

Figure 2:
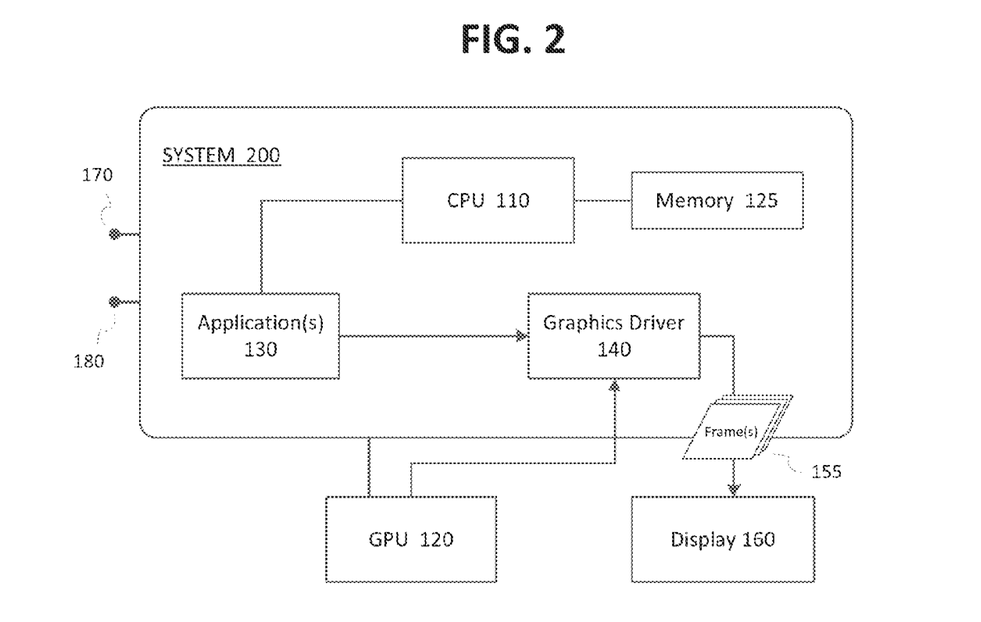
FIG. 2 illustrates another block diagram of an architecture suitable for carrying out embodiments of the invention.

The system 100 of FIG. 1 has been illustrated as integrated into a single platform. For instance, the CPU 110 and GPU 120 may be on the same processor die. Another embodiment is illustrated in FIG. 2 in which the CPU 110 and the GPU 120 are not necessarily on the same processor die. The GPU 120 may be, for instance, a separate graphics processing card communicatively coupled with the CPU 110.

The system 200 of FIG. 2 generally operates similar to the system 100 of FIG. 1. One or more applications 130 may be executing under the control of the CPU 110 and memory 125. The system 200 may further include a graphics driver 140. In operation, an application 130 may call the graphics driver 140 to present a frame 155 of video content. The graphics driver 140 may then handle the presenting of the frame 155 to the display 160. The frame presentation may or may not involve the GPU 120. The system 200 may be powered by either an external direct current (DC) source 170 or battery power 180. The graphics driver 140 may be operative to determine whether the system 100 is being powered by the external DC source 170 or the battery power 180. The system 200 may also be communicatively coupled with the display 160.

Once the graphics driver 140 determines that the system 100 is operating on battery power 180, the graphics driver 140 may take some additional steps to reduce the workload of the system 200 to conserve battery power 180. The additional steps are described in more detail below and may take place prior to the graphics driver 140 presenting a frame 155 to the display 160.

Included herein are one or more flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

In one embodiment, an application 130 may call the graphics driver 140 to present a frame 155. Before handling the frame presentation, the graphics driver 140 may put the application process (e.g., CPU thread) into a sleep state if the time to execute the frame is less than a defined frame execution time where the defined frame execution time may be a minimum frame execution time. Putting the application process to into a sleep state for a certain periods of time may cap the maximum frames per second (FPS) that may be executed.

Pseudo-code for the embodiment described above may be as follows:

```
Present( )
{
  // only limit the frame rate if running on battery power
  if( UsingDCBatteryPower( ) )
  {
    // calculate the number of CPU clocks that equal one millisecond
    static const double clocksPerMs =
        (double)GetCPUFrequency( ) / 1000.f;
    // calculate the minimum frame execution time in milliseconds
    static const double msPerFrame =
        1000.f / (double)FixedFrameRate;
    //determine the CPU timestamp at the end of the previous frame
    static double prevFrameMs =
        (double)GetCurrentCPUCounter( ) / clocksPerMs;
    double currFrameMs = 0.0f;
    bool complete = false;
    do
    {
      // determine the CPU timestamp at the end of the current frame
      currFrameMs =
          (double)GetCurrentCPUCounter( ) / clocksPerMs;
      // calculate the number of milliseconds elapsed between the
      previous and current frame const double elapsedMs =
      currFrameMs - prevFrameMs;
      // calculate the number of milliseconds remaining to limit the
frame
      // execution to the minimum frame execution time
      const double remainingMs = msPerFrame - elapsedMs;
      if( remainingMs >= 1.0f )
      {
        //put the CPU thread to sleep
        Sleep( (DWORD)remainingMs );
      }
      else
      {
        complete = true;
      }
    // Sleep function may return early, so continue putting the thread to
    // sleep until the minimum time has elapsed
    } while( !complete );
    prevFrameMs = currFrameMs;
  }
  // Present the frame
  PresentFrame( );
}
```

Figure 3:
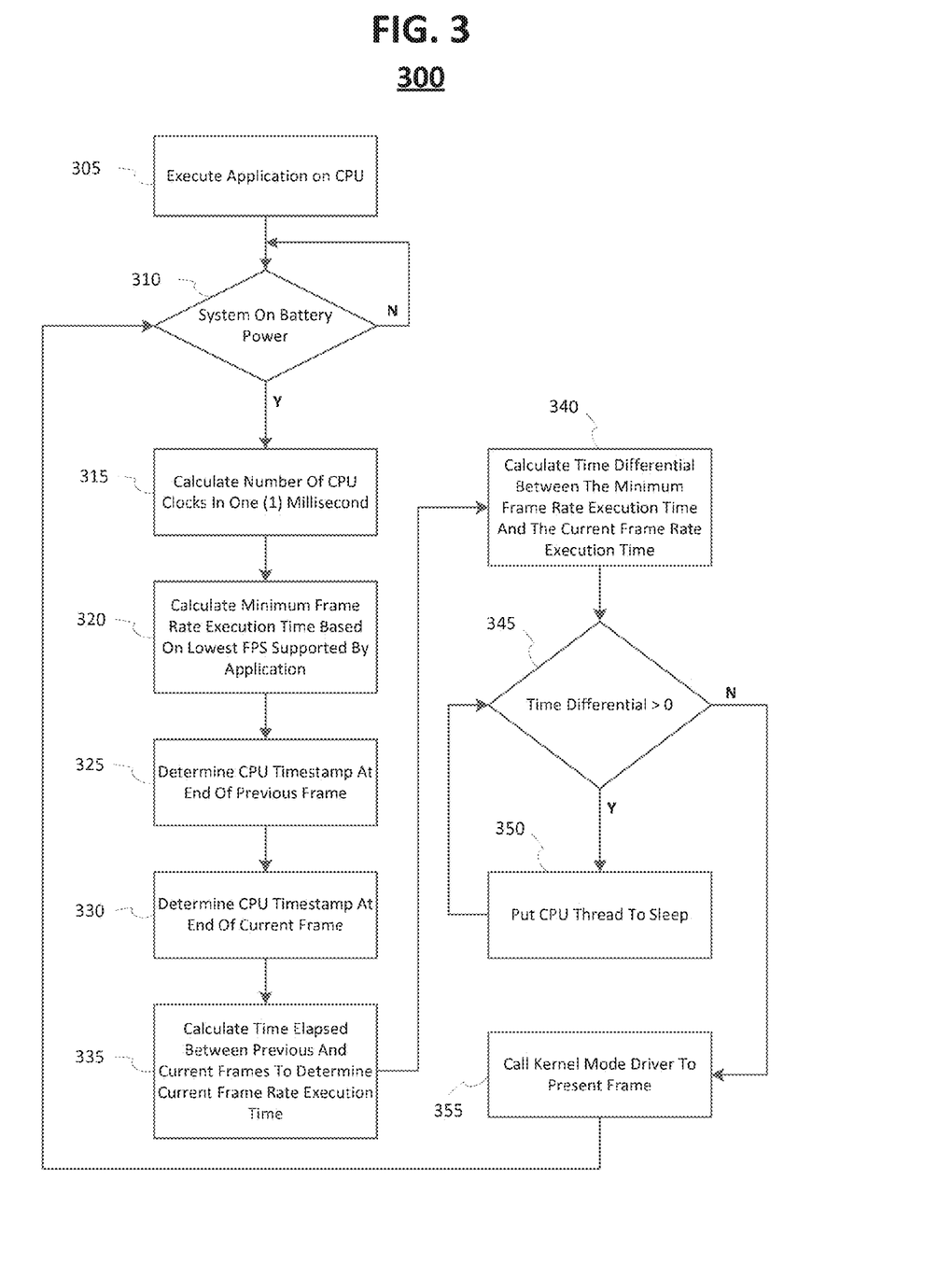
FIG. 3 illustrates one embodiment of a logic flow.

FIG. 3 illustrates one embodiment of a logic flow 300 in which battery power is conserved by reducing the workload of the GPU 125 according to embodiments of the invention. The logic flow 300 may be representative of some or all of the operations executed by one or more embodiments described herein.

In the illustrated embodiment shown in FIG. 3, the CPU 110 may be executing an application 130 at block 305. For example, one or more applications 130 may be executing on the system 100 under the control of CPU 110. Each application 105 may be associated with an instance of the graphics driver 140. Each application 130 may be generating frames 155 of video content ultimately intended to be displayed on a display 160. The rate (e.g., frames per second or FPS) at which the frames 155 are generated by the application 130 may be variable and include a defined frame execution time where the defined frame execution time may be a minimum frame execution time.

The graphics driver 140 may be called by the application 130 to present a frame 155. The time between successive calls to resent a frame 155 is termed the frame rate and may be expressed in milliseconds. Under normal operating conditions, each application 130 will execute according to the settings specified within the given application 105. For example, an application 130 may have a minimum frame execution rate of 50 FPS which corresponds to a frame rate execution time of 20 milliseconds per frame. The same application 130 may have a maximum frame execution rate of 75 FPS which corresponds to a frame rate execution time of approximately 13.33 milliseconds per frame. The embodiments are not limited in this context.

The logic flow 300 may determine whether the system 100 is operating on battery power 140 at block 310. For example, the system 100 may be operative on battery power 180 or may receive power from an external DC source 150. An external DC source 170 may be representative of the system being plugged in to an alternating current (AC) outlet. The power from the AC outlet may pass through a rectifier that converts it to DC for operating the system 100. When the system 100 is receiving power from an external DC source 170, power consumption is less of an issue. However, when the system 100 is receiving power from a battery 180, power consumption is an issue because the charge in the battery 180 is limited and dwindles with system 100 use. The graphics driver 140 may be capable of determining when the system 100 is operating on battery power 180. In such cases, certain power savings techniques may be implemented to extend the life of the battery while powering the system 100. The embodiments are not limited in this context.

The logic flow 300 may calculate the number of CPU clock cycles for each millisecond at block 315. For example, the CPU 110 may operate at a specified clock rate of one (1) gigahertz (GHz). A 1 GHz rated clock for CPU 110 corresponds to one million clock cycles each millisecond. The embodiments are not limited in this context.

The logic flow 300 may determine the minimum frame rate execution time based at block 320. In the example above, the application 130 had a minimum frame rate of 50 FPS. One second is equal to 1000 milliseconds. Thus, 1000 milliseconds/50 FPS yields 20 milliseconds per frame as the minimum frame rate execution time. The embodiments are not limited in this context.

The logic flow 300 may determine a CPU timestamp at the end of a previous frame at block 325. For example, it may be known from block 315 above the number of clock cycles per millisecond. The CPU timestamp at the end of a previous frame may be determined by dividing the current CPU counter by the previously determined clock cycles per milliseconds. The result of the division operation yields a time value in milliseconds representative of the CPU timestamp at the end of the previous frame. The embodiments are not limited in this context.

The logic flow 300 may determine a CPU timestamp at the end of a current frame at block 330. For example, it may be known from block 315 above the number of clock cycles per millisecond. The CPU timestamp at the end of the current frame may be determined by dividing the current CPU counter by the previously determined clock cycles per milliseconds. The result of the division operation yields a time value in milliseconds representative of the CPU timestamp at the end of the current frame. The embodiments are not limited in this context.

The logic flow 300 may calculate the time elapsed between the end of the previous frame and the end of the current frame at block 335. For example, it may be known from block 325 above that the CPU timestamp at the end of the previous frame was one value in milliseconds. It may also be known from block 330 above that the CPU timestamp at the end of the current frame was another value in milliseconds. Subtracting the value obtained in block 325 from the value obtained in block 330 yields the current frame execution rate time for the application 130. If the time value for the previous frame were found to be 110 milliseconds and the time value of the current frame were found to be 123.33 milliseconds, the difference would be 13.33 milliseconds. Converting this back to a current frame rate yields 75 FPS. The embodiments are not limited in this context.

The logic flow 300 may calculate a time differential between the minimum frame rate execution time and the current frame rate execution time at block 340. For example, the minimum frame rate execution time may have been determined already at block 320. The current frame rate execution time may have been determined already at block 335. The time differential may be calculated by subtracting the current frame rate execution time from the minimum frame rate execution time. Referring back to the example above, the minimum frame rate execution time was found to be 20 milliseconds (50 FPS) while the current frame rate execution time was found to be 13.33 milliseconds (75 FPS). Thus, the current frame rate is faster than the minimum frame rate. The embodiments are not limited in this context.

The logic flow 300 may determine if the time differential is greater than zero (0) at block 345. For example, the current frame rate for the application may be at levels higher than the minimum frame rate. When the system 100 is operating on battery power 180, there is an opportunity to conserve power by forcing a reduction in the current frame rate to equal that of the minimum frame rate. When the time differential is greater than zero milliseconds it means that the system is generating more frames than is necessary for the minimum frame rate of the application 130. The embodiments are not limited in this context.

The logic flow 300 may put the CPU thread associated with the application 130 generating the frames into a sleep state while the time differential is greater than zero (0) at block 350. For example, because the time differential is greater than zero (0) milliseconds the system 100 may be able to reduce its workload by reducing the frame rate to the minimum frame rate supported by the application 130. This may be done by putting the CPU thread generating frames 155 for application 130 into a sleep state for the time differential calculated at block 340. Referring to the example, the CPU thread may generate a frame 155 in 13.33 milliseconds and make a call to the graphics driver 140 to present the frame 155. Under normal conditions, the CPU thread would remain in an active state and continue working and move on to generating a next frame. However, by putting the CPU thread into a sleep state for the time differential of 6.67 milliseconds, the CPU 110 and need not work to generate frames 155 during those 6.67 milliseconds. So long as the time differential remains positive, the CPU thread will kept in a sleep state. Once the time differential has expired to zero, the graphics driver 140 may then present the frame to the display 160 at block 355. The net result is that the CPU thread in this example may be put into a sleep state for 50% of the time to force the current frame rate of 75 FPS down to the minimum frame rate of 50 FPS thereby conserving power and extending the life of the battery 180. The numbers used in the example are illustrative and may be different for different systems 100 or applications 130. The embodiments are not limited in this context.

In another embodiment, an application 130 may call the graphics driver 140 to present a frame 155. Before handling the frame presentation, the graphics driver 140 may put the application process (e.g., CPU thread) into a sleep state for a fixed percentage of the total frame execution time. Putting the application process into a sleep state for a certain periods of time may reduce the maximum frames per second (FPS) that may be executed by a fixed percentage.

Pseudo-code for the embodiment described above may be as follows:

```
Present( )
{
    // only limit the frame rate if running on battery power
    if( UsingDCBatteryPower( ) )
    {
        // calculate the number of CPU clocks that equal one millisecond
        static const double clocksPerMs =
            (double)GetCPUFrequency( ) / 1000.f;
        //determine the CPU timestamp at the end of the previous frame
        static double prevFrameMs =
            (double)GetCurrentCPUCounter( ) / clocksPerMs;
        // determine the CPU timestamp at the end of the current frame
        double currFrameMs =
            (double)GetCurrentCPUCounter( ) / clocksPerMs;
        // calculate the minimum frame execution time in milliseconds as a
        // percentage of the current frame execution time
        const double msPerFrame =
            ( currFrameMs - prevFrameMs ) *
            (double)StaticReductionPercentage;
        bool complete = false;
        do
        {
            currFrameMs =
                (double)GetCurrentCPUCounter( ) / clocksPerMs;
            // calculate the number of milliseconds elapsed between the
            // previous and current frame
            const double elapsedMs = currFrameMs - prevFrameMs;
            // calculate the number of milliseconds remaining to limit the frame
            // execution to the minimum frame execution time
            const double remainingMs = msPerFrame - elapsedMs;
            if( remainingMs >= 1.0f )
            {
                //put the CPU thread to sleep
                Sleep( (DWORD)remainingMs );
            }
            else
            {
                complete = true;
            }
        // Sleep function may return early, so continue putting the thread to
        // sleep until the minimum time has elapsed
        } while( !complete );
        prevFrameMs = currFrameMs;
    }
    // Present the frame
    PresentFrame( );
}
```

Figure 4:
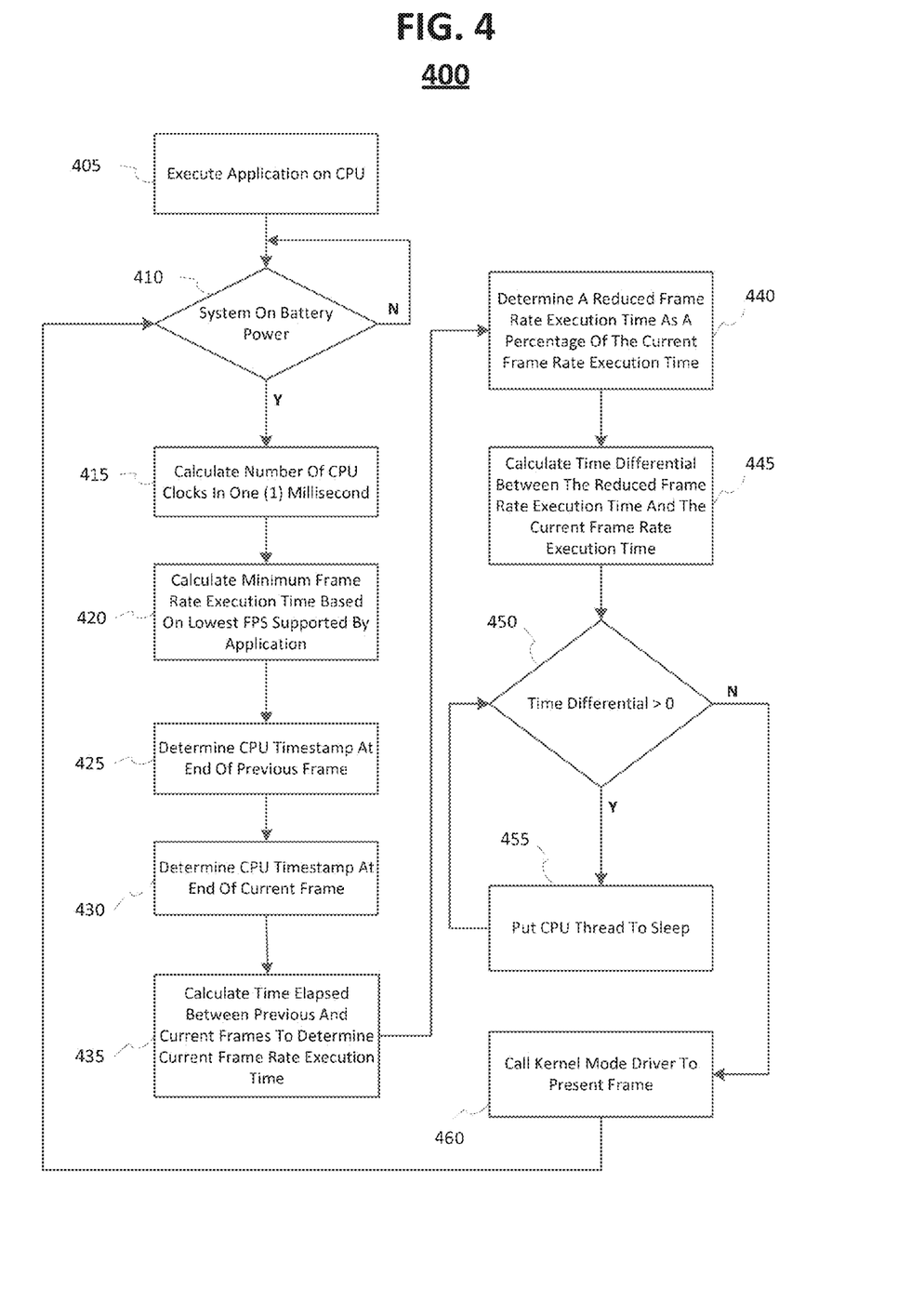
FIG. 4 illustrates one embodiment of a logic flow.

FIG. 4 illustrates one embodiment of a logic flow 400 in which battery power is conserved by reducing the workload of the GPU 125 according to embodiments of the invention. The logic flow 400 may be representative of some or all of the operations executed by one or more embodiments described herein.

In the illustrated embodiment shown in FIG. 4, the CPU 110 may be executing an application 130 at block 405. For example, one or more applications 130 may be executing on the system 100 under the control of CPU 110. Each application 105 may be associated with an instance of the graphics driver 140. Each application 130 may be generating frames 155 of video content ultimately intended to be displayed on a display 160. The rate (e.g., frames per second or FPS) at which the frames 155 are generated by the application 130 may be variable and include a defined frame execution time where the defined frame execution time may be a minimum frame execution time.

The graphics driver 140 may be called by the application 130 to present a frame 155. The time between successive calls to resent a frame 155 is termed the frame rate and may be expressed in milliseconds. Under normal operating conditions, each application 130 will execute according to the settings specified within the given application 105. For example, an application 130 may have a minimum frame execution rate of 50 FPS which corresponds to a frame rate execution time of 20 milliseconds per frame. The same application 130 may have a maximum frame execution rate of 75 FPS which corresponds to a frame rate execution time of approximately 13.33 milliseconds per frame. The embodiments are not limited in this context.

The logic flow 400 may determine whether the system 100 is operating on battery power 140 at block 410. For example, the system 100 may be operative on battery power 180 or may receive power from an external DC source 150. An external DC source 170 may be representative of the system being plugged in to an alternating current (AC) outlet. The power from the AC outlet may pass through a rectifier that converts it to DC for operating the system 100. When the system 100 is receiving power from an external DC source 170, power consumption is less of an issue. However, when the system 100 is receiving power from a battery 180, power consumption is an issue because the charge in the battery 180 is limited and dwindles with system 100 use. The graphics driver 140 may be capable of determining when the system 100 is operating on battery power 180. In such cases, certain power savings techniques may be implemented to extend the life of the battery while powering the system 100. The embodiments are not limited in this context.

The logic flow 400 may calculate the number of CPU clock cycles for each millisecond at block 415. For example, the CPU 110 may operate at a specified clock rate of one (1) gigahertz (GHz). A 1 GHz rated clock for CPU 110 corresponds to one million clock cycles each millisecond. The embodiments are not limited in this context.

The logic flow 400 may determine the minimum frame rate execution time based at block 420. In the example above, the application 130 had a minimum frame rate of 50 FPS. One second is equal to 1000 milliseconds. Thus, 1000 milliseconds/50 FPS yields 20 milliseconds per frame as the minimum frame rate execution time. The embodiments are not limited in this context.

The logic flow 400 may determine a CPU timestamp at the end of a previous frame at block 425. For example, it may be known from block 415 above the number of clock cycles per millisecond. The CPU timestamp at the end of a previous frame may be determined by dividing the current CPU counter by the previously determined clock cycles per milliseconds. The result of the division operation yields a time value in milliseconds representative of the CPU timestamp at the end of the previous frame. The embodiments are not limited in this context.

The logic flow 400 may determine a CPU timestamp at the end of a current frame at block 430. For example, it may be known from block 415 above the number of clock cycles per millisecond. The CPU timestamp at the end of the current frame may be determined by dividing the current CPU counter by the previously determined clock cycles per milliseconds. The result of the division operation yields a time value in milliseconds representative of the CPU timestamp at the end of the current frame. The embodiments are not limited in this context.

The logic flow 400 may calculate the time elapsed between the end of the previous frame and the end of the current frame at block 435. For example, it may be known from block 425 above that the CPU timestamp at the end of the previous frame was one value in milliseconds. It may also be known from block 430 above that the CPU timestamp at the end of the current frame was another value in milliseconds. Subtracting the value obtained in block 425 from the value obtained in block 430 yields the current frame execution rate time for the application 130. If the time value for the previous frame were found to be 110 milliseconds and the time value of the current frame were found to be 123.33 milliseconds, the difference would be 13.33 milliseconds. Converting this back to a current frame rate yields 75 FPS. The embodiments are not limited in this context.

The logic flow 400 may determine a reduced frame rate execution time at block 440. For example, the reduced frame rate execution time may be determined based on a percentage of the current frame rate calculated at block 435. If the current frame rate is 75 FPS and the minimum frame rate is 50 FPS, then the application may support a frame rate between 50 and 75 FPS. Since the system 100 is operating on battery power 180, a reduction in the frame rate may conserve power. For instance, a 20% reduction of the current frame rate would reduce the frame rate to 60 FPS. Sixty (60) FPS corresponds to one frame every 16.67 milliseconds. The embodiments are not limited in this context.

The logic flow 400 may calculate a time differential between the reduced frame rate execution time and the current frame rate execution time at block 445. For example, the reduced frame rate execution time may have been determined already at block 440. The current frame rate execution time may have been determined already at block 435. The time differential may be calculated by subtracting the current frame rate execution time from the reduced frame rate execution time. Referring back to the example above, the reduced frame rate execution time was found to be 16.67 milliseconds (60 FPS) while the current frame rate execution time was found to be 13.33 milliseconds (75 FPS). Thus, the current frame rate is faster than the minimum frame rate. The embodiments are not limited in this context.

The logic flow 400 may determine if the time differential is greater than zero (0) at block 450. For example, the current frame rate for the application may be at levels higher than the minimum frame rate. When the system 100 is operating on battery power 180, there is an opportunity to conserve power by forcing a reduction in the current frame rate to equal that of the minimum frame rate. When the time differential is greater than zero milliseconds it means that the system is generating more frames than is necessary for the minimum frame rate of the application 130. The embodiments are not limited in this context.

The logic flow 400 may put the CPU thread associated with the application 130 generating the frames into a sleep state while the time differential is greater than zero (0) at block 455 For example, because the time differential is greater than zero (0) milliseconds the system 100 may be able to reduce its workload by reducing the frame rate to the minimum frame rate supported by the application 130. This may be done by putting the CPU thread generating frames 155 for application 130 into a sleep state for the time differential calculated at block 440. Referring to the example, the CPU thread may generate a frame 155 in 13.33 milliseconds and make a call to the graphics driver 140 to present the frame 155. Under normal conditions, the CPU thread would remain active and continue working and move on to generating a next frame. However, by putting the CPU thread into a sleep state for the time differential of 3.34 milliseconds, the CPU 110 and need not work to generate frames 155 during those 3.34 milliseconds. So long as the time differential remains positive, the CPU thread will kept in a sleep state. Once the time differential has expired to zero, the graphics driver 140 may then present the frame to the display 160 at block 460. The net result is that the CPU thread in this example may be in a sleep state for 25% of the time to force the current frame rate of 75 FPS down to the reduced frame rate of 60 FPS thereby conserving power and extending the life of the battery 180. The numbers used in the example are illustrative and may be different for different systems 100 or applications 130. The embodiments are not limited in this context.

In another embodiment, an application 130 may call the graphics driver 140 to present a frame 155. Before handling the frame presentation, the graphics driver 140 may put the application process (e.g., CPU thread) into a sleep state for a percentage of the total frame execution time. The percentage may be based on the remaining battery power 180. Putting the application process into a sleep state for a certain periods of time may reduce the maximum frames per second (FPS) that may be executed.

Pseudo-code for the embodiment described above may be as follows:

```
Present( )
{
  // only limit the frame rate if running on battery power
  if( UsingDCBatteryPower( ) )
  {
    // calculate the number of CPU clocks that equal one millisecond
    static const double clocksPerMs =
        (double)GetCPUFrequency( ) / 1000.f;
    //determine the CPU timestamp at the end of the previous frame
    static double prevFrameMs =
        (double)GetCurrentCPUCounter( ) / clocksPerMs;
    // determine the CPU timestamp at the end of the current frame
    double currFrameMs =
        (double)GetCurrentCPUCounter( ) / clocksPerMs;
    // calculate the minimum frame execution time in milliseconds as a
    // percentage of the current frame execution time, where the
    // percentage is a function of the remaining battery power
    const double msPerFrame =
        ( currFrameMs − prevFrameMs ) *
        (double)DynamicReductionPercentage( batteryPower );
    bool complete = false;
    do
    {
      currFrameMs =
          (double)GetCurrentCPUCounter( ) / clocksPerMs;
      // calculate the number of milliseconds elapsed between the
      // previous and current frame
      const double elapsedMs = currFrameMs − prevFrameMs;
      // calculate the number of milliseconds remaining to limit the
frame
      // execution to the minimum frame execution time
      const double remainingMs = msPerFrame − elapsedMs;
      if( remainingMs >= 1.0f )
      {
        //put the CPU thread to sleep
        Sleep( (DWORD)remainingMs );
      }
      else
      {
        complete = true;
      }
      // Sleep function may return early, so continue putting the thread to
sleep
      // until the minimum time has elapsed
    } while( !complete );
    prevFrameMs = currFrameMs;
  }
  // Present the frame
  PresentFrame( );
}
```

Figure 5:
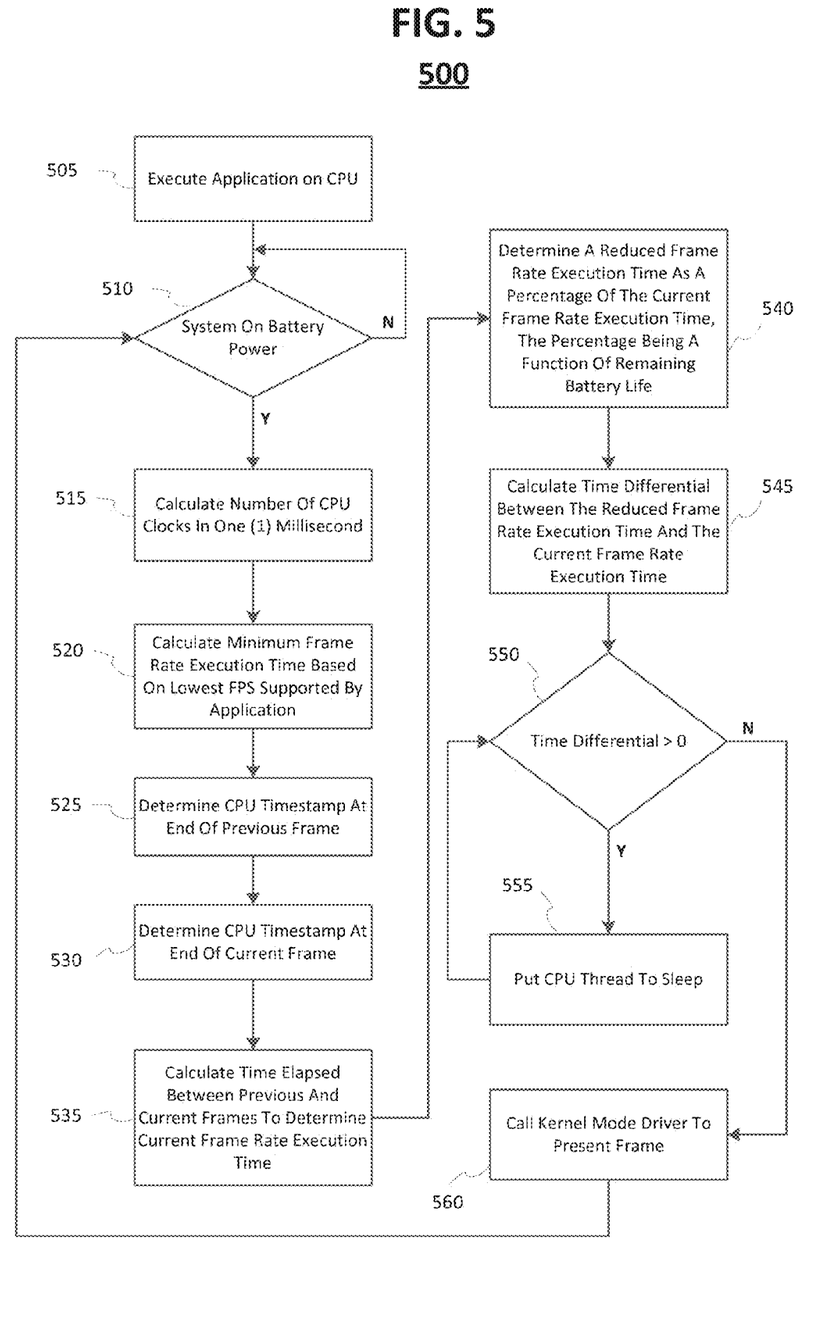
FIG. 5 illustrates one embodiment of a logic flow.

FIG. 5 illustrates one embodiment of a logic flow 500 in which battery power is conserved by reducing the workload of the GPU 125 according to embodiments of the invention. The logic flow 500 may be representative of some or all of the operations executed by one or more embodiments described herein.

In the illustrated embodiment shown in FIG. 5, the CPU 110 may be executing an application 130 at block 505. For example, one or more applications 130 may be executing on the system 100 under the control of CPU 110. Each application 105 may be associated with an instance of the graphics driver 140. Each application 130 may be generating frames 155 of video content ultimately intended to be displayed on a display 160. The rate (e.g., frames per second or FPS) at which the frames 155 are generated by the application 130 may be variable and include a defined frame execution time where the defined frame execution time may be a minimum frame execution time.

The graphics driver 140 may be called by the application 130 to present a frame 155. The time between successive calls to resent a frame 155 is termed the frame rate and may be expressed in milliseconds. Under normal operating conditions, each application 130 will execute according to the settings specified within the given application 105. For example, an application 130 may have a minimum frame execution rate of 50 FPS which corresponds to a frame rate execution time of 20 milliseconds per frame. The same application 130 may have a maximum frame execution rate of 75 FPS which corresponds to a frame rate execution time of approximately 13.33 milliseconds per frame. The embodiments are not limited in this context.

The logic flow 500 may determine whether the system 100 is operating on battery power 140 at block 510. For example, the system 100 may be operative on battery power 180 or may receive power from an external DC source 150. An external DC source 170 may be representative of the system being plugged in to an alternating current (AC) outlet. The power from the AC outlet may pass through a rectifier that converts it to DC for operating the system 100. When the system 100 is receiving power from an external DC source 170, power consumption is less of an issue. However, when the system 100 is receiving power from a battery 180, power consumption is an issue because the charge in the battery 180 is limited and dwindles with system 100 use. The graphics driver 140 may be capable of determining when the system 100 is operating on battery power 180. In such cases, certain power savings techniques may be implemented to extend the life of the battery while powering the system 100. The embodiments are not limited in this context.

The logic flow 500 may calculate the number of CPU clock cycles for each millisecond at block 515. For example, the CPU 110 may operate at a specified clock rate of one (1) gigahertz (GHz). A 1 GHz rated clock for CPU 110 corresponds to one million clock cycles each millisecond. The embodiments are not limited in this context.

The logic flow 500 may determine the minimum frame rate execution time based at block 520. In the example above, the application 130 had a minimum frame rate of 50 FPS. One second is equal to 1000 milliseconds. Thus, 1000 milliseconds/50 FPS yields 20 milliseconds per frame as the minimum frame rate execution time. The embodiments are not limited in this context.

The logic flow 500 may determine a CPU timestamp at the end of a previous frame at block 525. For example, it may be known from block 515 above the number of clock cycles per millisecond. The CPU timestamp at the end of a previous frame may be determined by dividing the current CPU counter by the previously determined clock cycles per milliseconds. The result of the division operation yields a time value in milliseconds representative of the CPU timestamp at the end of the previous frame. The embodiments are not limited in this context.

The logic flow 500 may determine a CPU timestamp at the end of a current frame at block 530. For example, it may be known from block 515 above the number of clock cycles per millisecond. The CPU timestamp at the end of the current frame may be determined by dividing the current CPU counter by the previously determined clock cycles per milliseconds. The result of the division operation yields a time value in milliseconds representative of the CPU timestamp at the end of the current frame. The embodiments are not limited in this context.

The logic flow 500 may calculate the time elapsed between the end of the previous frame and the end of the current frame at block 535. For example, it may be known from block 525 above that the CPU timestamp at the end of the previous frame was one value in milliseconds. It may also be known from block 530 above that the CPU timestamp at the end of the current frame was another value in milliseconds. Subtracting the value obtained in block 525 from the value obtained in block 530 yields the current frame execution rate time for the application 130. If the time value for the previous frame were found to be 110 milliseconds and the time value of the current frame were found to be 123.33 milliseconds, the difference would be 13.33 milliseconds. Converting this back to a current frame rate yields 75 FPS. The embodiments are not limited in this context.

The logic flow 500 may determine a reduced frame rate execution time as function of remaining battery power 180 at block 540. For example, the reduced frame rate execution time may be determined based on a percentage of the current frame rate calculated at block 535. If the current frame rate is 75 FPS and the minimum frame rate is 50 FPS, then the application may support a frame rate between 50 and 75 FPS. Since the system 100 is operating on battery power 180, a reduction in the frame rate may conserve power. For instance, a 20% reduction of the current frame rate would reduce the frame rate to 60 FPS. Sixty (60) FPS corresponds to one frame every 16.67 milliseconds.

Deciding when and how much to reduce the frame rate may be a function of how much battery power 180 remains. The graphics driver 140 may be capable of determining the percentage of battery power 180 remaining at any given moment. This information may be used to determine how aggressively to reduce the frame rate. For instance, graphics driver 140 may be programmed to reduce the current frame rate a first time (e.g., 75 FPS to 60 FPS) when the percentage of battery power 180 dips beneath a first threshold level (e.g., 75%). In addition, the frame rate may be further reduced (e.g., 60 FPS to 50 FPS) when the percentage of battery power 180 dips beneath a second threshold level (e.g., 40%). The embodiments are not limited in this context.

The logic flow 500 may calculate a time differential between the reduced frame rate execution time and the current frame rate execution time at block 545. For example, the reduced frame rate execution time may have been determined already at block 540. The current frame rate execution time may have been determined already at block 535. The time differential may be calculated by subtracting the current frame rate execution time from the reduced frame rate execution time. Referring back to the example above, the reduced frame rate execution time was found to be 16.67 milliseconds (60 FPS) while the current frame rate execution time was found to be 13.33 milliseconds (75 FPS). Thus, the current frame rate is faster than the minimum frame rate. The embodiments are not limited in this context.

The logic flow 500 may determine if the time differential is greater than zero (0) at block 550. For example, the current frame rate for the application may be at levels higher than the minimum frame rate. When the system 100 is operating on battery power 180, there is an opportunity to conserve power by forcing a reduction in the current frame rate to equal that of the minimum frame rate. When the time differential is greater than zero milliseconds it means that the system is generating more frames than is necessary for the minimum frame rate of the application 130. The embodiments are not limited in this context.

The logic flow 500 may put the CPU thread associated with the application 130 generating the frames into a sleep state while the time differential is greater than zero (0) at block 555 For example, because the time differential is greater than zero (0) milliseconds the system 100 may be able to reduce its workload by reducing the frame rate to the minimum frame rate supported by the application 130. This may be done by putting the CPU thread generating frames 155 for application 130 into a sleep state for the time differential calculated at block 540. Referring to the example, the CPU thread may generate a frame 155 in 13.33 milliseconds and make a call to the graphics driver 140 to present the frame 155. Under normal conditions, the CPU thread would remain active and continue working and move on to generating a next frame. However, by putting the CPU thread into a sleep state for the time differential of 3.34 milliseconds, the CPU 110 and need not work to generate frames 155 during those 3.34 milliseconds. So long as the time differential remains positive, the CPU thread will kept in a sleep state. Once the time differential has expired to zero, the graphics driver 140 may then present the frame to the display 160 at block 560. The net result is that the CPU thread in this example may be in a sleep state for 25% of the time to force the current frame rate of 75 FPS down to the reduced frame rate of 60 FPS thereby conserving power and extending the life of the battery 180. The numbers used in the example are illustrative and may be different for different systems 100 or applications 130. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Figure 6:
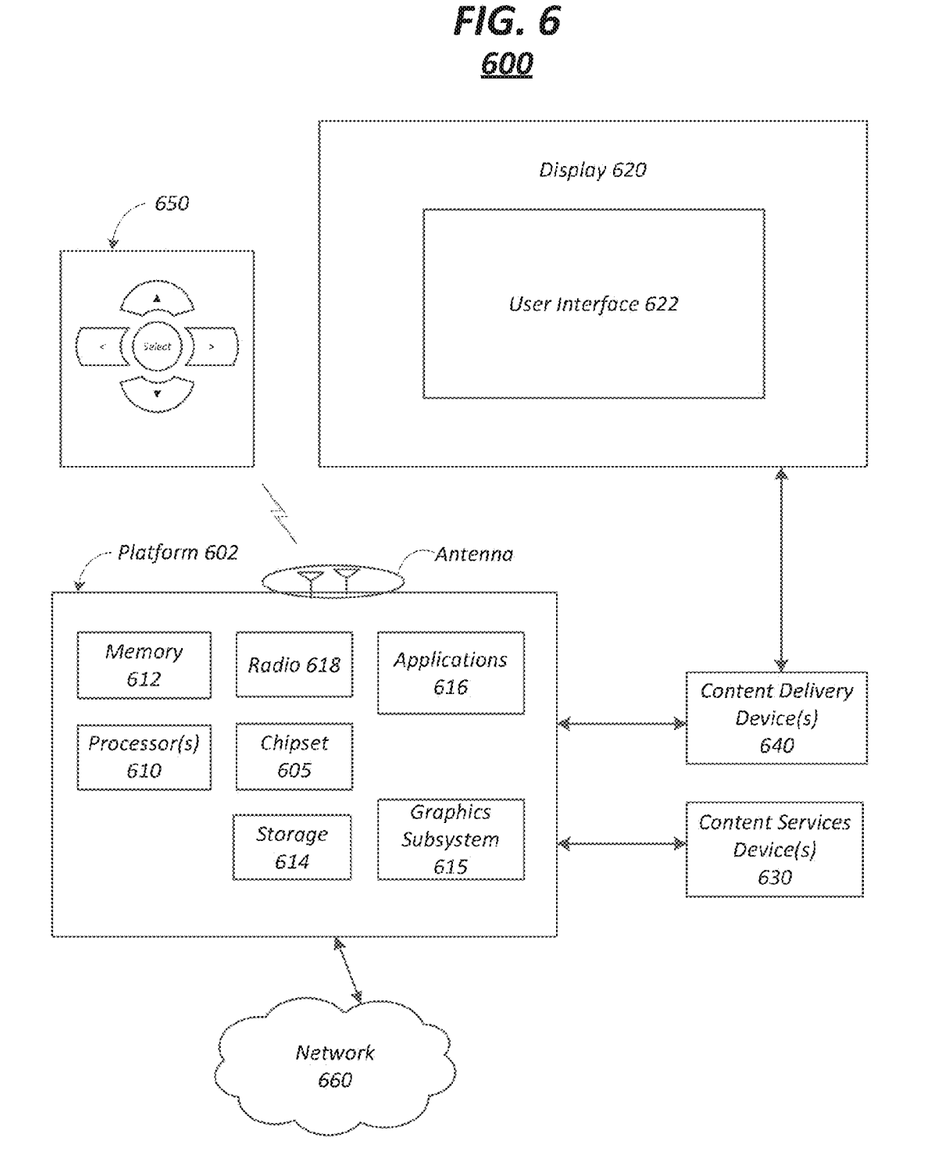
FIG. 6 illustrates an embodiment of a system that may be suitable for implementing embodiments of the disclosure.

FIG. 6 illustrates an embodiment of a system 600 that may be suitable for implementing the forced VSYNC processing embodiments of the disclosure. In embodiments, system 600 may be a system capable of forcing VSYNC although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these components is described in more detail below.

In embodiments, platform 602 may comprise any combination of a chipset 605, processor(s) 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor(s) 610 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor(s) 610 may comprise dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, display 620 may comprise any television type monitor or display. Display 620 may comprise, for example, a computer display screen, touch screen display, video monitor, television-like device, and/or a television. Display 620 may be digital and/or analog. In embodiments, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In embodiments, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/or display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit embodiments of the invention.

In embodiments, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but integrated into platform 602 and/or display 620. Embodiments, however, are not limited to the elements or in the context shown or described herein.

In embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 6.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
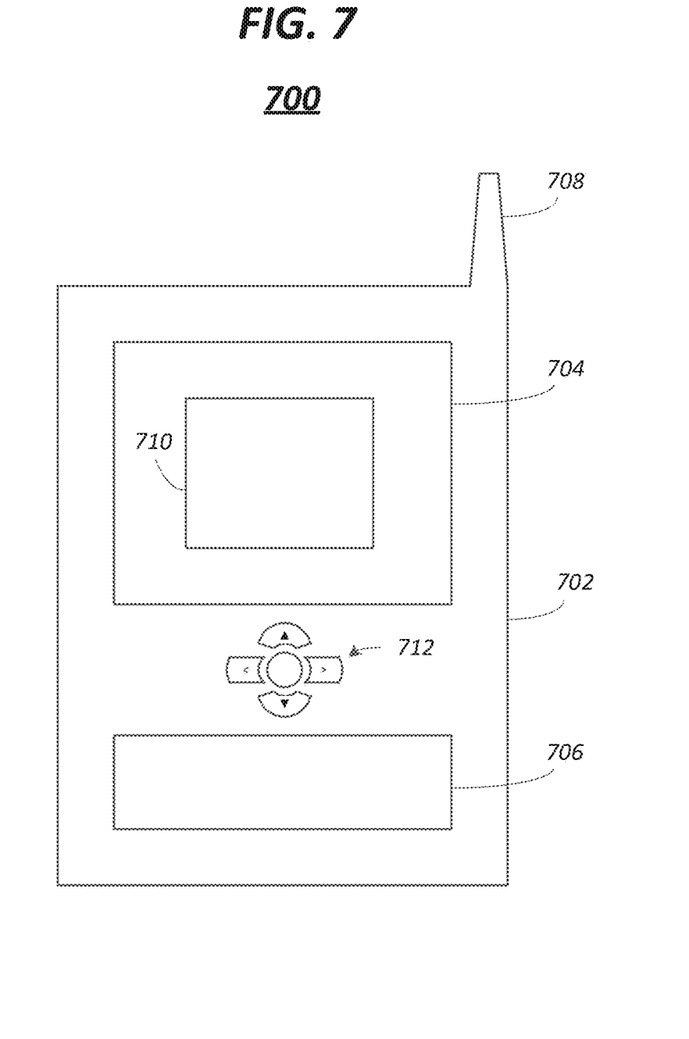
FIG. 7 illustrates embodiments of a small form factor device in which the system of FIG. 6 may be embodied.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
  a processor circuit; and
  a graphics driver operative on the processor circuit to execute an application that generates frames of video content at a defined frame rate associated with a defined frame rate execution time, the graphics driver operative to:
    calculate a time elapsed between a previous frame and a current frame to determine a current frame rate execution time;
    calculate a time differential by subtracting the current frame rate execution time from the defined frame rate execution time; and
    switch a processor thread associated with the application generating the current frame to a sleep state while the time differential is greater than zero (0).

2. The apparatus of claim 1, the graphics driver operative to:
  present the current frame to a display when the time differential reaches zero (0).

3. The apparatus of claim 2, comprising:
  a display communicatively coupled with the processor circuit, the display operative to render the current frame presented by the graphics driver.

4. The apparatus of claim 1, comprising a battery coupled to the processor circuit, the battery operative to provide power to the processor circuit.

5. The apparatus of claim 1, the defined frame rate being a minimum frame rate supportable by the application.

6. A apparatus comprising:
  a processor circuit; and
  a graphics driver operative on the processor circuit to execute an application that generates frames of video content at a defined frame rate associated with a defined frame rate execution time, the graphics driver operative to:

calculate a time elapsed between a previous frame and a current frame to determine a current frame rate execution time;

fix a reduced frame rate execution time that is between the defined frame rate execution time and the current frame rate execution time;

calculate a time differential by subtracting the current frame rate execution time from the reduced frame rate execution time; and switch a processor thread associated with the application generating the current frame to a sleep state while the time differential is greater than zero (0).

7. The apparatus of claim 6, comprising the graphics driver operative to:

present the current frame to a display when the time differential reaches zero (0).

8. The apparatus of claim 7, comprising:

a display communicatively coupled with the graphics driver, the display operative to render the current frame presented by the graphics driver.

9. The apparatus of claim 6, comprising a battery operative to power the processor circuit.

10. The apparatus of claim 6, the graphics driver operative to determine a percentage level of remaining battery power.

11. The apparatus of claim 10, the graphics driver operative to adjust the reduced frame rate lower when the percentage level of remaining battery power is lower than a threshold percentage level.

12. The apparatus of claim 6, the defined frame rate being a minimum frame rate supportable by the application.

13. A method, comprising:

executing an application on a central processing unit (CPU), the application operative to generate frames of video content at a defined frame rate associated with a defined frame rate execution time;

calculating a time elapsed between a previous frame and a current frame to determine a current frame rate execution time;

calculating a time differential by subtracting the current frame rate execution time from the defined frame rate execution time; and switching a CPU thread associated with the application generating the current frame to a sleep state while the time differential is greater than zero (0).

14. The method of claim 13, comprising:

switching the CPU thread to a sleep state only while the CPU is operating on battery power.

15. The method of claim 13, comprising:

presenting the current frame to a display when the time differential reaches zero (0).

16. The method of claim 13, wherein the defined frame rate is a minimum frame rate supportable by the application.

17. A method, comprising:

executing an application on a central processing unit (CPU), the application operative to generate frames of video content at a defined frame rate associated with a defined frame rate execution time;

calculating a time elapsed between a previous frame and a current frame to determine a current frame rate execution time;

fixing a reduced frame rate execution time that is between the defined frame rate execution time and the current frame rate execution time;

calculating a time differential by subtracting the current frame rate execution time from the reduced frame rate execution time; and switching a CPU thread associated with the application generating the current frame to a sleep state while the time differential is greater than zero (0).

18. The method of claim 17, comprising:

switching the CPU thread to a sleep state only while the CPU is operating on battery power.

19. The method of claim 17, comprising:

presenting the current frame to a display when the time differential reaches zero (0).

20. The method of claim 17, comprising:

determining a percentage level of remaining battery power while the CPU is operating on battery power.

21. The method of claim 17, comprising:

adjusting the reduced frame rate lower when the percentage level of remaining battery power is lower than a threshold percentage level.

22. The method of claim 17, wherein the defined frame rate is a minimum frame rate supportable by the application.

23. An article of manufacture comprising a computer-readable storage medium containing instructions that when executed cause a system to:

execute an application on a processor circuit, the application operative to generate frames of video content at a frame rate associated with a frame rate execution time;

determine a current frame rate execution time;

determine a time differential between the current frame rate execution time and the defined frame rate execution time; and switch a CPU thread associated with the application generating the current frame to a sleep state for a period equal to the time differential.

24. The article of claim 23 containing instructions that when executed cause a system to:

switch the CPU thread to a sleep state only while the processor circuit is operating on battery power.

25. The article of claim 23 containing instructions that when executed cause a system to:

present the current frame to a display when the time differential reaches zero (0).

26. The article of claim 23, wherein the defined frame rate is a minimum frame rate supportable by the application.

27. An article of manufacture comprising a computer-readable storage medium containing instructions that when executed cause a system to:

execute an application on a central processing unit (CPU), the application operative to generate frames of video content at a defined frame rate associated with a defined frame rate execution time;

determine a current frame rate execution time;

fix a reduced frame rate execution time that is lower than the current frame rate execution time;

determine a time differential between the current frame rate execution time and the reduced frame rate execution time; and switch a CPU thread associated with the application generating the current frame to a sleep state for a period equal to the time differential.

28. The article of claim 27 containing instructions that when executed cause a system to:

switch the CPU thread to a sleep state only while the CPU is operating on battery power.

29. The article of claim 27 containing instructions that when executed cause a system to:

present the current frame to a display when the time differential reaches zero (0).

30. The article of claim 27 containing instructions that when executed cause a system to:
   determine a percentage level of remaining battery power while the CPU is operating on battery power.

31. The article of claim 30 containing instructions that when executed cause a system to:
   adjust the reduced frame rate lower when the percentage level of remaining battery power is lower than a threshold percentage level.

32. The article of claim 27, wherein the defined frame rate is a minimum frame rate supportable by the application.

* * * * *